May 20, 1947.  S. F. GASPRO ET AL  2,420,944
WEED REMOVER
Filed Sept. 3, 1946
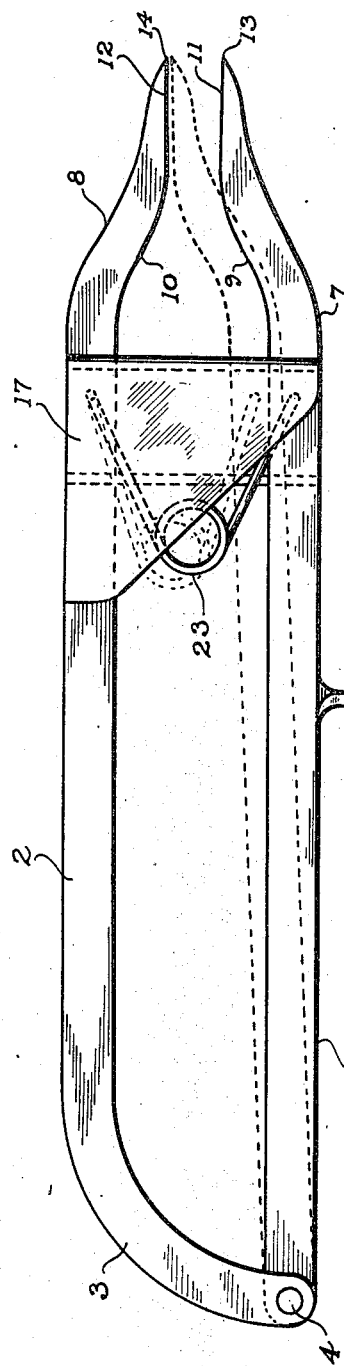
Fig. 1.
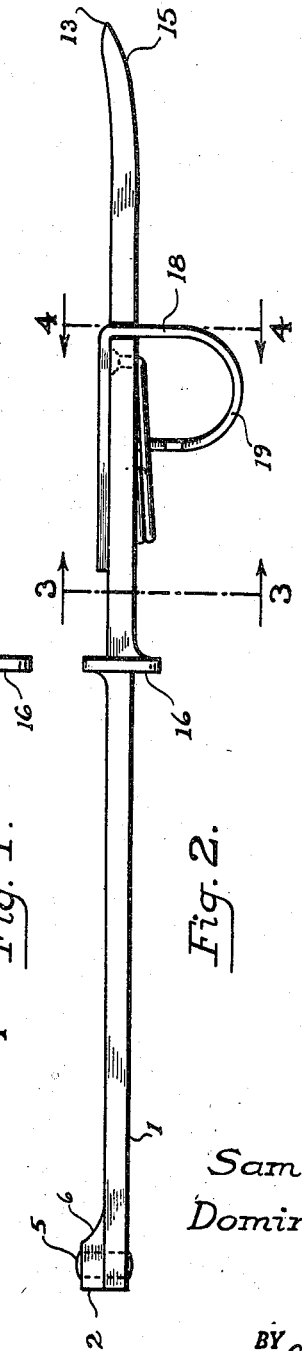
Fig. 2.
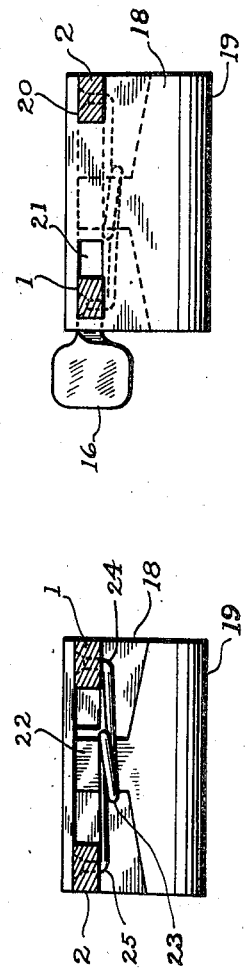
Fig. 4.
Fig. 3.
Sam F. Gaspro
Dominick G. Gaspro
INVENTORS
BY
Samuel S. Jacobson
Atty.

Patented May 20, 1947

2,420,944

UNITED STATES PATENT OFFICE 2,420,944

WEED REMOVER

Sam F. Gaspro and Dominick G. Gaspro, Portland, Oreg.

Application September 3, 1946, Serial No. 694,546

3 Claims. (Cl. 254—132)

This invention is related to garden tools and particularly to tools employed for the removal of undesirable plants from the earth. It particularly relates to improvements in weed removing implements adapted primarily for the removal of weeds from lawns without causing any appreciable damage to the lawn.

The invention in its broad structural aspects consists of a pair of arms that are hinged together at one end and terminating in sharply pointed jaws at the other end. These arms are normally held apart by a compression spring and are maintained in lateral alignment at all times by a slot formed in a reinforcing element which also acts as a fulcrum, when the sharp pointed ends of the arms penetrate the earth and are pressed around the root of a weed and then, using the two arms as a lever, the root is bodily removed from the earth.

One of the objects of the invention is to provide a weed remover that can be easily handled for removing weeds from lawns without doing any damage to the lawn.

Another object is to provide a weed remover that prevents the masceration of the root of the weed before it is removed from the earth by packing a sufficient amount of dirt around the weed root, as the weed remover embodying the principles of our invention, penetrates and surrounds the root and loosens and finally removes the weed from the earth.

Another object of our invention, of course, is to provide a weed remover which is simple in construction and operation and which can be cheaply manufactured and distributed.

The accompanying drawing illustrates a weed remover made in accordance with our invention, in which:

Figure 1 is an elevational view showing the open and closed positions of the arms;

Figure 2 is a side elevation;

Figure 3 is a sectional elevation taken on line 3—3 of Figure 2 to show the position of the spring and the method of reinforcing the fulcrum, both of which are elements in the weed remover; and Figure 4 is a sectional elevation taken on line 4—4 of Figure 2, showing the slots formed in the fulcrum for the arms of the weed remover.

The invention conists of a pair of arms 1 and 2, arm 2 being curved as at 3 to provide the desired spacing between the arms, when they are hinged together, as at 4, by any desirable means, such as by a pin or rivet 5. In order to have arms 1 and 2 positioned in a lateral plane, that portion of the curved end 3 of arm 2 which is hinged to arm 1 is indented, as shown at 6 in Figure 2, leaving the rest of arm 2 in the same lateral plane as arm 1. The other ends 7 and 8 of arms 1 and 2 respectively have the same structural characteristics. Each is bent inwardly, as shown at 9 and 10, in converging relationship to each other culminating in flat jaw surfaces 11 and 12 and tapered sharp points 13 and 14, resulting in contours characteristic of common forceps or tweezers. The underside of each end 7 and 8 near their respective points is slightly curved, as shown at 15 in Figure 2, and a like curve is formed under point 14 of end 8. A finger rest and guide 16 is formed in arm 1, approximately midway between its hinged and its pointed ends.

A reinforcing plate 17 is securely joined to the top of arm 2 in any desirable manner, as by welding, and extends downwardly, as shown at 18, and inwardly, as shown at 19, to form a rounded fulcrum. A recess 20 is formed in the side 18 into which arm 2 is fixedly positioned and a slot 21 is formed at the opposite end of side 18 in which arm 1 is slidably positioned so that it may assume the position in relation to arm 2, as shown in Figure 1, when the jaws 11 and 12 are brought together. To add strength to and reinforce the fulcrum base 19 of the reinforcing plate 17, a leg 22 extends upwardly from fulcrum base 19 and contacts the underside of plate 17, as shown in full line in Figure 3 and dotted line in Figure 4.

A resilient element, such as a compression spring 23, has one of its legs 24 secured to the underside of arm 1 and the other of its legs 25 secured to the underside of arm 2 so that arms 1 and 2 are normally held apart, as shown in full line in Figure 1.

In using the weed remover embodying the principles of our invention, the arms are held with the hand so that the first two fingers firmly hold the finger rest 16 between them and the thumb overlaps arm 2. The points of the jaws 11 and 12 are then forced downwardly and forwardly into the earth surrounding the weed to be removed so that they embrace some of the dirt around the main stem of the root of the weed and are then closed tightly around the root. The fulcrum base 19 is then placed on the ground and pressure is applied on the arms which act as the lever and the fulcrum base acts as the fulcrum in a lever and fulcrum motion to loosen the weed and remove it from the earth.

The foregoing completes the detailed description of our invention and we claim as new and useful and desire Letters Patent on:

1. A weeder comprising, a pair of hinged arms culminating in sharply pointed pincer jaws, a slotted reinforcing plate secured to one of the arms and allowing lateral movement to the other of the arms positioned in the slot of said plate, said reinforcing plate culminating in a rounded fulcrum base below said arms and a resilient member joined to the arms to normally maintain the jaws in open position.

2. A weeder as claimed in claim 1 including a finger rest and hand guide secured to one of said arms.

3. A weeder comprising a pair of arms spaced apart from each other but hinged together at one end and culminating in sharply pointed pincer jaws at the other end, said jaws having their underside slightly rounded for easy penetration into the ground, a reinforcing plate secured to one of said arms near the point where the arms converge into jaws, said plate having a slot formed therein for the other arm to move freely in lateral relation to the other arm to close said jaws, said reinforcing plate extending downwardly and backwardly under both of the arms to form a rounded fulcrum, a compression spring joined to the arms and normally maintaining said arms apart, and a finger rest and hand guide secured to one of said arms to give proper control of the arms when the jaws penetrate the ground and the arms are used as a lever to remove a weed from the ground.

SAM F. GASPRO.
DOMINICK G. GASPRO.

REFERENCES CITED

The following references are of record in the file of this patent:

UNITED STATES PATENTS

| Number | Name | Date |
|---|---|---|
| 2,016,640 | Lehota | Oct. 8, 1935 |
| 1,502,246 | Hagopian | July 22, 1924 |